United States Patent

Dirx

[11] Patent Number: 5,893,002
[45] Date of Patent: Apr. 6, 1999

[54] CASSETTE AND METHOD FOR DAYLIGHT-LOADING A PHOTOGRAPHIC SHEET PACK

[75] Inventor: Lieven Dirx, Oud Turnhout, Belgium

[73] Assignee: Agfa-Gevaert, Mortsel, Belgium

[21] Appl. No.: 868,385

[22] Filed: Jun. 3, 1997

Related U.S. Application Data

[60] Provisional application No. 60/025,322, Jun. 6, 1996.

[30] Foreign Application Priority Data

Jun. 6, 1996 [EP] European Pat. Off. .............. 96201583

[51] Int. Cl.⁶ ............................. G03B 17/26; G03D 17/00

[52] U.S. Cl. .......................... 396/518; 396/602; 206/455; 53/492

[58] Field of Search ..................................... 396/518, 602, 396/594; 206/455, 454; 378/174, 182; 53/449, 461, 464, 463, 492

[56] References Cited

U.S. PATENT DOCUMENTS

| | | | |
|---|---|---|---|
| 4,909,386 | 3/1990 | Plessers et al. | 206/455 |
| 4,933,696 | 6/1990 | Schmidt et al. | 396/518 |
| 5,145,166 | 9/1992 | Neudecker et al. | 396/518 |
| 5,649,411 | 7/1997 | Dirx | 53/492 |

*Primary Examiner*—D. Rutledge
*Attorney, Agent, or Firm*—Baker & Botts, L.L.P.

[57] ABSTRACT

A cassette for daylight-loading a photographic sheet pack in a photographic processor, which sheet pack is of a type comprising a stack of rectangular photographic light-sensitive sheets wrapped in an oversized wrapper, which cassette comprises:

- a rectangular base (20) with a bottom wall and peripheral walls providing an interior space within which a sheet pack can fit, and
- a cassette lid (40) fitting on the base and comprising a rectangular (41) frame arranged for lighttightly fitting on the peripheral walls, and a sub-lid (42) lighttightly fitting on the frame.

16 Claims, 9 Drawing Sheets

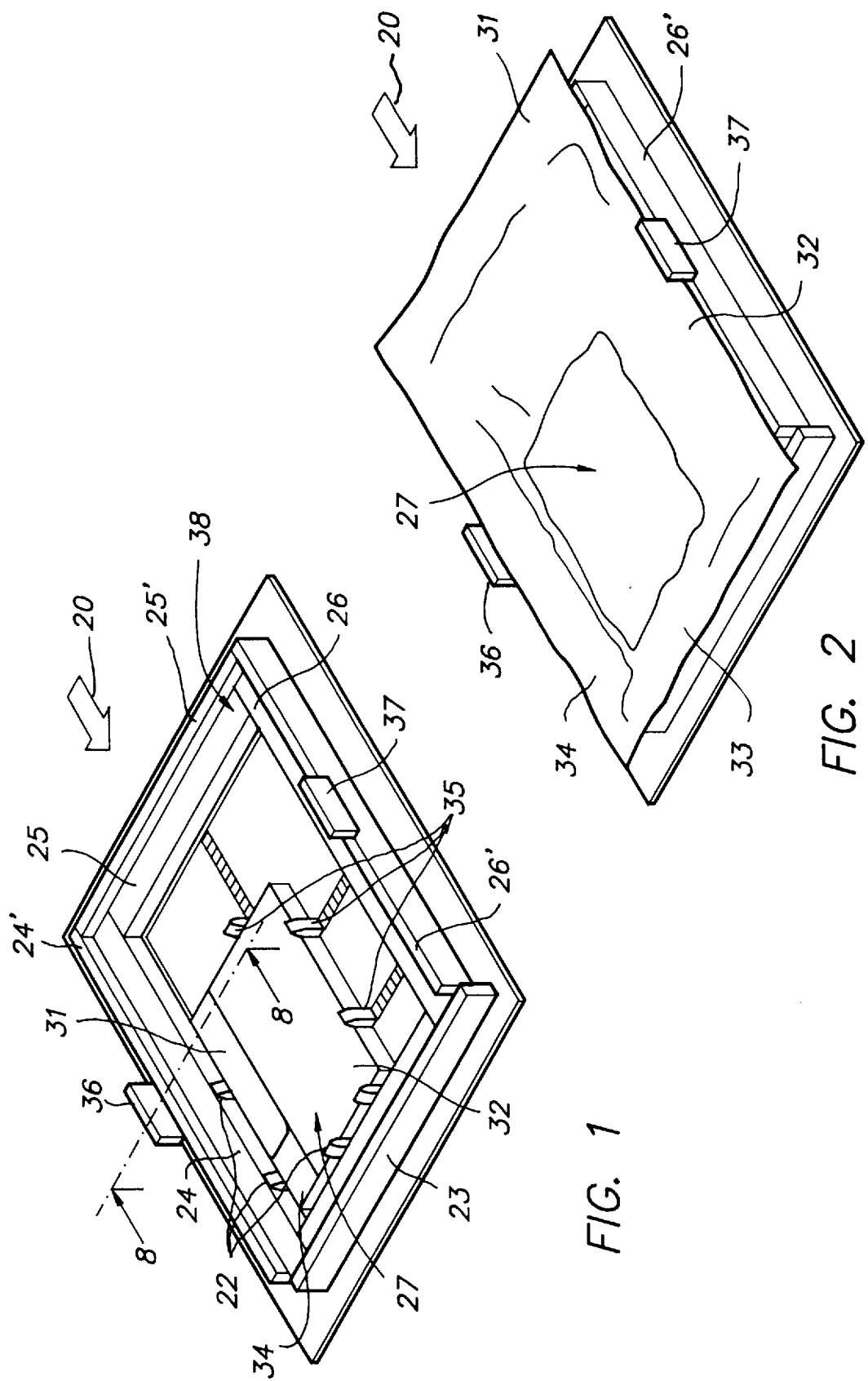

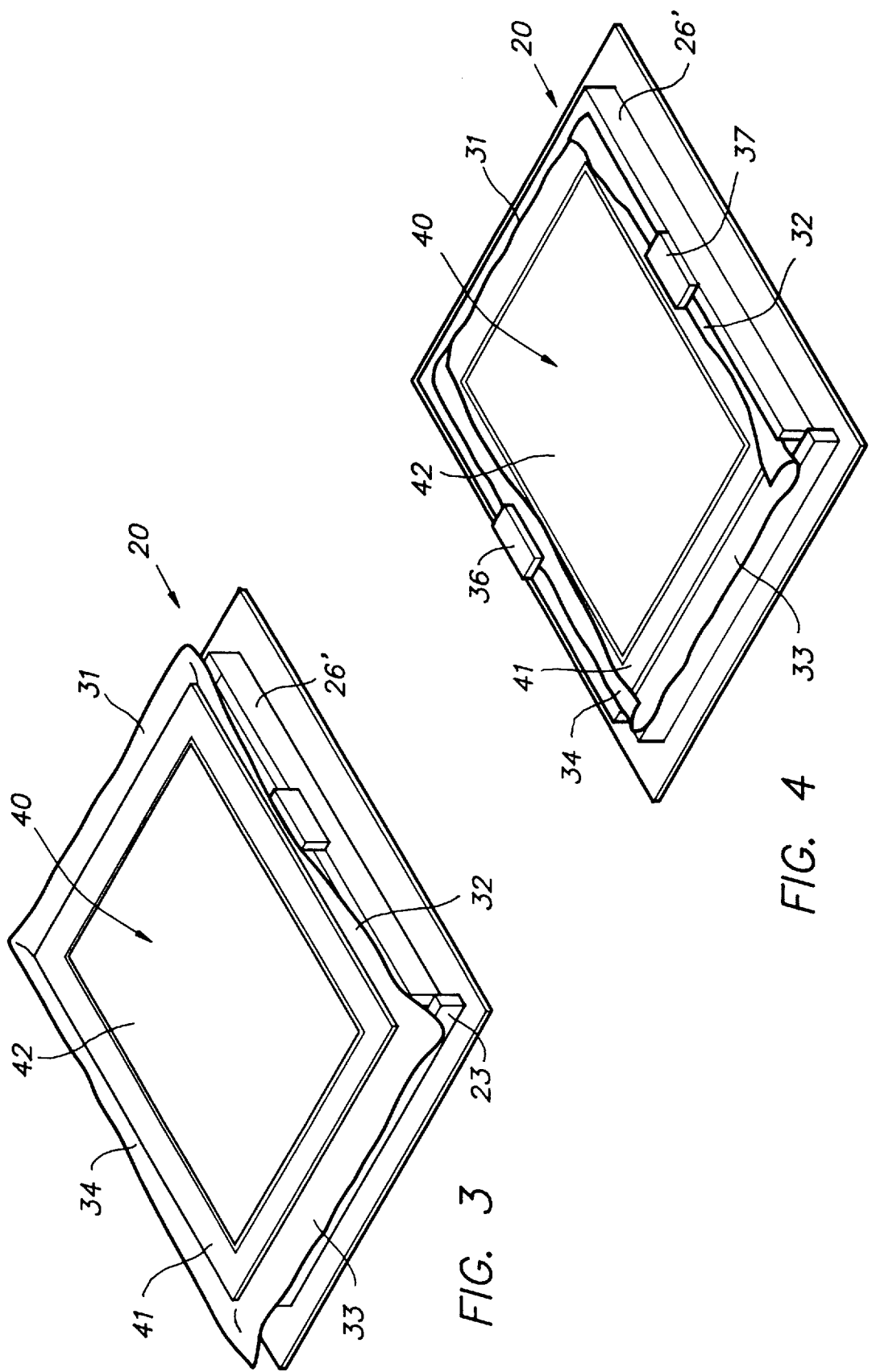

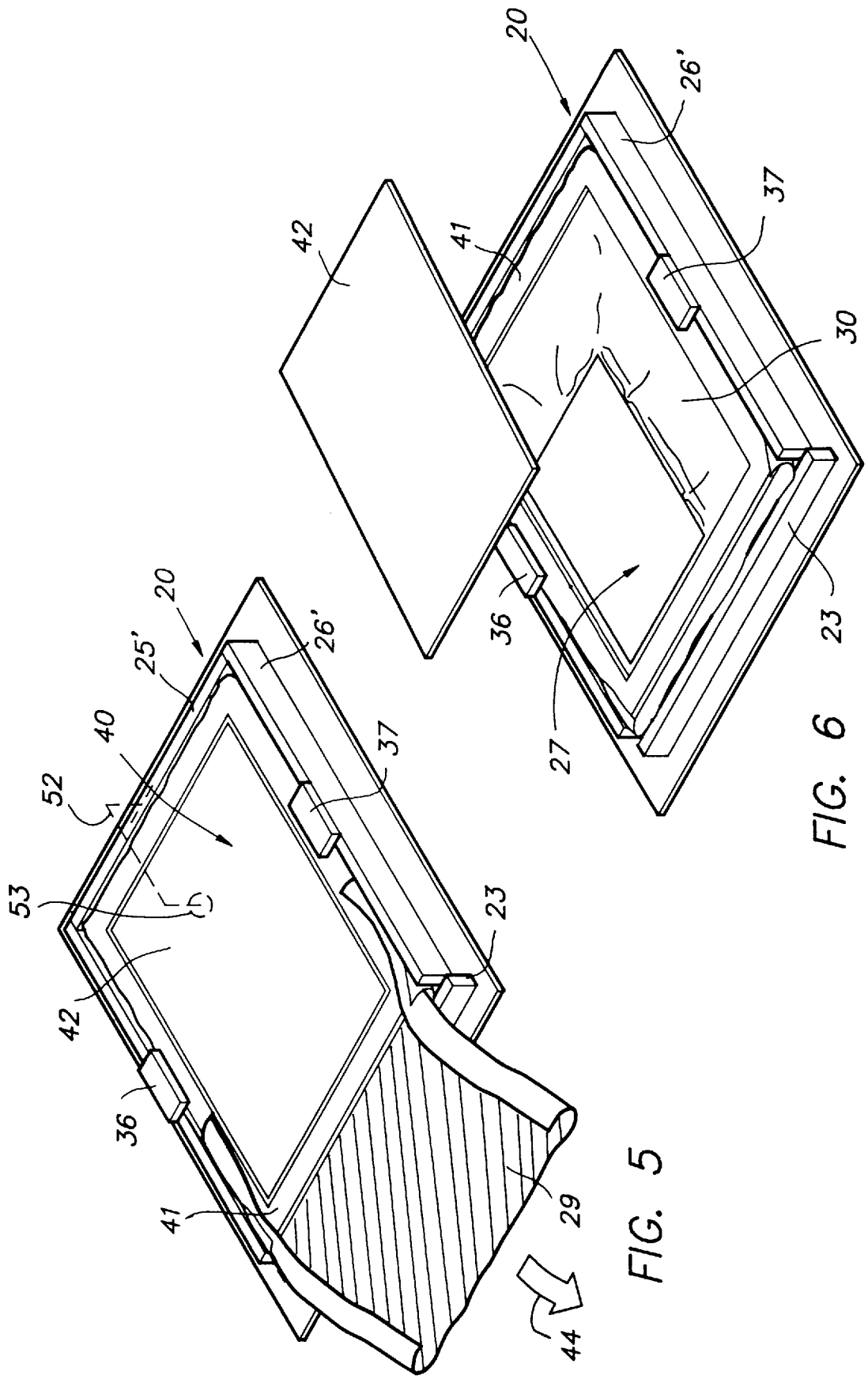

CASSETTE AND METHOD FOR DAYLIGHT-LOADING A PHOTOGRAPHIC SHEET PACK

The application claims the benefit of the U.S. Provisional Application No. 60/025,322, filed Jun. 6, 1996.

BACKGROUND OF THE INVENTION

1. Field of the Invention

The present invention relates to a cassette and a method for daylight-loading a photographic sheet pack in a photographic processor.

2. Description of the Prior Art

It is known to avoid the use of a darkroom for loading light-sensitive films into a film processor such as a cassette-loading apparatus which automatically reloads radiographic film cassettes with a fresh film after an X-ray exposed film has been removed.

These apparatus usually comprise a film supply magazine in the form of a drawer or the like that can be opened and into which a lighttightly wrapped stack of films is put in daylight conditions. Next, the drawer is closed and an appropriate mechanism cuts the wrapper so that it can be peeled from the film stack manually or automatically. One example of suchlike system is disclosed in U.S. Pat. No. 4,909,389 relating to a film-sheet package for use in the magazine of a reloader for radiographic film cassettes. The film wrapper is in the form of a sleeve having a sealed flap for engagement by a winding mechanism. The end opposite to the sealed flap has an open flap folded inwardly to lighttightly close the package. Opening of the package occurs by winding the sealed flap by means of a winding mechanism, the film stack as such being withheld, so that the sleeve is stripped from the stack of film sheets. Another example of suchlike system is disclosed in Research Disclosure 22936 of May 1983, Havant, Hampshire, GB.

While these systems work satisfactorily for radiographic film, they are unsuited for aluminium offset printing plates, that e.g. must be image-wise exposed in a platesetter, because such plates have right, sharp corners as distinct from the rounded corners of X-ray film, and also the size of these plates can amount to 81×111 cm, and the weight of a stack of 30 of them can amount up to 50 kg.

An improved method for lighttightly wrapping and daylight-loading plates of the type referred to has been disclosed in EP 0 718 683 A2 assigned to the same assignee as the one of the present application. This method comprises the steps of wrapping a stack of light-sensitive sheets in a wrapper formed by two congruent lighttight wrapping foils and providing such wrapper with a first peripheral lighttight closure spaced from the four edges of said stack of sheets, providing said wrapper with a clamping, second peripheral lighttight closure located between said first one and the perimeter of said sheet stack, opening said first closure in daylight and loading said wrapped stack of sheets while still closed by said second closure in an opened cabinet, lighttightly closing said cabinet, unclamping said second closure and removing the wrapping foil lying on top of said sheets to set them free for further processing.

SUMMARY OF THE INVENTION

It is one object of the present invention to provide a novel cassette which is excellently suited for carrying out the method described hereinbefore.

It is a further object to provide an improved method for daylight-loading a photographic sheet pack in a photographic processor.

STATEMENTS OF THE INVENTION

In accordance with the present invention a cassette for daylight-loading a photographic sheet pack in a photographic processor, said sheet pack being of a type comprising a stack of rectangular photographic light-sensitive sheets wrapped in a wrapper of a size larger than that of the sheets, is characterised in that it comprises:

a rectangular base with a bottom wall and peripheral wall means providing an interior space within which the sheet pack can fit, and a cassette lid fitting on the base comprising rectangular frame means arranged for lighttightly co-operating with said peripheral wall means and a sub-lid lighttightly fitting on said frame means.

A cassette according to the invention can have generally the form of conventional photographic sheet cassettes designed for hand--handling but, considering its particular field of application, it is suitably arranged for co-operation with, or for making part of, a carriage or a drawer arranged for supporting the cassette and transferring it from a preparation position outside of a processor to a cassette-opening and unloading position inside such processor.

The term "processor" stands in the present description in particular for a so-called "computer-to-plate" imagesetter in which an imagewise modulated laser beam writes an image on an offset printing plate, but it is clear that it also covers more conventional machines e.g. one wherein an image is optically projected on the plate and next developed.

Suitable embodiments of a cassette according to the invention are as follows.

The rectangular frame means of the lid of the cassette has a size generally co-extensive with the peripheral wall means of the base.

The cassette comprises at least three bars provided on the lateral sides of said base for controlling the lateral position of said lid on said base.

The cassette comprises positioning means for controlling the position of said lid also in the direction of said fourth lateral side.

The cassette comprises frame-locking means for locking the frame of the lid to the base.

The cassette sub-lid is completely removable from the frame and has means providing a lighttight fit with said frame.

The cassette has adjustable means for locating photographic sheet packs of different sizes at the correct place in the cassette base.

The present invention includes also a method for daylight-loading a photographic sheet pack in a photographic processor.

In accordance with the invention a method for daylight-loading a photographic sheet pack in a photographic processor, said sheet pack being of a type comprising a stack of rectangular photographic sheets wrapped in an oversized wrapper, the extending portions of the wrapper being back-folded on the sheet pack, comprises the steps of:

unfolding the back-folded wrapper portions and putting said film pack in a cassette comprising a base and a lid lighttighly fitting thereon while yet leaving a peripheral gap through which a peripheral portion of the unfolded wrapper can protrude out of the cassette, cutting the wrapper protruding out of the cassette, and removing its outer portion, thereby leaving separate wrapping foils inside of the cassette, pulling away the wrapping foil adjacent to the cassette lid through said peripheral gap, and introducing the cassette thus prepared in said photographic processor, lighttigthly closing the processor, and having the lid of the cassette removed to render the photographic sheets accessible for a sheet removing mechanism.

According to a suitable embodiment of the method according to the invention, sheet packs of different sizes are wrapped in wrappers all having the same overall dimensions so that such different sheet packs can be loaded in one cassette size. Suchlike sheet packs all can take a central position in the cassette, but they can also be arranged for taking an assymetric position, e.g. one having one corner of a cassette as reference position.

The method according to the invention has been developed in particular in connection with the daylight-loading of aluminium offset printing plates in a computer-to-plate imagesetter, but the foregoing makes it clear that the scope of the invention is not limited to this particular application.

BRIEF DESCRIPTION OF THE DRAWINGS

The invention will be described hereinafter by way of example with reference to the accompanying drawings, wherein:

FIG. 1 is a perspective view of one embodiment of a cassette according to the present invention, the cassette being open and loaded with a fresh sheet pack, FIG. 2 is a perspective view of the cassette of FIG. 1, the oversized flaps of the wrapper being unfolded, FIG. 3 shows the casette of FIG. 2, the cassette lid being installed, FIG. 4 shows the cassette of FIG. 3, the frame of the lid being clamped and the oversize wrapper being cut and removed, FIG. 5 shows the cassette of FIG. 4, the top foil of the wrapper being pulled-out from the cassette, and FIG. 6 shows the cassette sub-lid being removed.

DETAILED DESCRIPTION OF THE INVENTION

Figure 7:
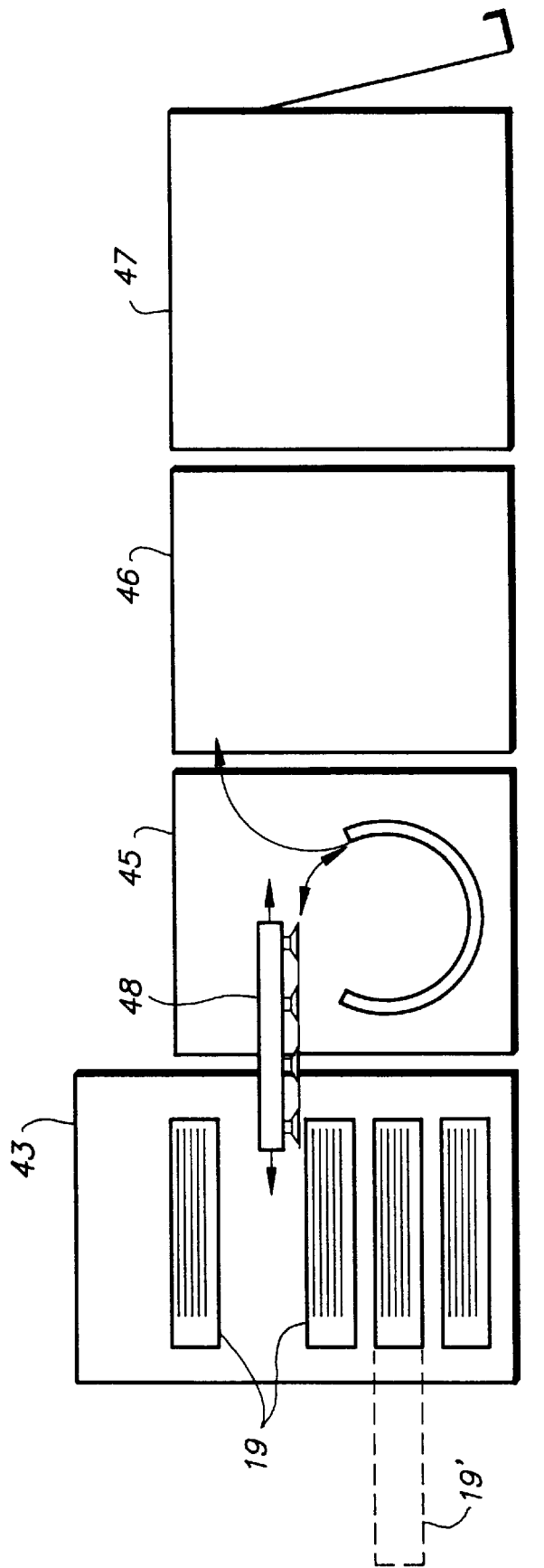
FIG. 7 is a diagrammatic view of a platesetter arrangement with a plate handler at its input.

FIG. 1 shows one embodiment of the base of a cassette according to the invention. Base 20 comprises a sturdy bottom wall 21, made of plywood, aluminium, reinforced plastic or the like, onto which are mounted four upstanding bars 23, 24, 25 and 26 forming a rectangular frame defining an interior space within which a lighttight sheet pack 27 is located.

Sheet pack 27 is of a type comprising a stack of rectangular light-sensitive aluminium offset printing plates wrapped in an oversized wrapper formed by two congruent lighttight wrapping foils 29 and 30 (see FIGS. 5 and 6) made of a strong and lighttight plastic such as VALERON (Tradename for a biaxially stretched polyethylene wrapping foil manufactured by VAN LEER Plastics Inc., USA) and heat-sealed to each other at their edges to form a light- and airtight protection for the plates. The four oversize flaps of the wrapper are folded on top of the pack, e.g. flaps 31, 32 and 34, 33 being not visible in this figure.

The plate sizet being smaller than the largest size the cassette can accept, the sheet pack is kept at the desired location by means of laterally adjustable vertical fingers 35.

Thus, corner 19 of the interior space of the cassette is used as a reference point for different sizes of cassettes. Stationary fingers, such as 22 limit the contact of the sheet pack with the corresponding inside wall surfaces of the base to a reduced surface only.

The top surfaces of frame bars 23, 24, 25 and 26 lie in one horizontal plane and constitute thereby a rectangular peripheral platform 38 surrounding the interior space of the cassette base. The height of this platform 38 corresponds almost with that of the sheet pack. Bars 24, 25 and 26 are provided with raised bars 24', 25' and 26', forming a frame within which the lid of the cassette can fit, and which thereby control the lateral position of the lid on the base in three directions. Such control is not obtained in the direction of wall 23, but can be performed by a clamp retaining the lid of a closed cassette (see later).

Clamps 36 and 37 are swingable and are arranged to clamp the lid of the cassette on the base.

FIG. 2 shows loaded base 20 with the oversize flaps 31 to 34 of sheet pack 27 unfolded so as to extend on all four sides of the base beyond peripheral platform 38. The figure clearly shows that unfolded flaps 33 and 34 have approximately the same width, whereas flaps 31 and 32 are notably wider. This difference in width depends on the size of the sheet pack in relation to the cassette and it will be understood that a sheet pack that completely fills the cassette will have flaps of nearly equal widths.

FIG. 3 shows the cassette, lid 40 lying over the unfolded wrapper portions. Lid 40 actually consists of a rectangular frame 41 made of a dimensionally stable material such as aluminium, reinforced plastic or the like, in the opening of which fits a sub-lid 42 in a lighttight way. Frame 41 fits with a slight clearance 51 between walls 24', 25' and 26' (see FIG. 9), so that corresponding flaps 31, 32 and 34 of the wrapper can outwardly extend therethrough. Flap 33, on the contrary, is not deflected but extends almost horizontally over wall 23. Frame 41 has a dual function. First, it forms a lighttight gap together with platform 38, allowing removal of the upper wrapping foil from the package as will be described hereinafter. Second, it will keep the lower wrapping foil away from the exposed stack of plates so that removal of the upper plate each time from the stack will not be hindered.

FIG. 4 shows the cassette, clamps 36 and 37 being swung inwardly so that frame 41 is now urged on base 20. The operator can now cut away the remainder of the wrapper so that in fact two separate but congruent wrapping foils are left that are kept clamped together along a peripheral zone determined by the co-operating surfaces of frame 41 and peripheral platform 38. The described cutting can occur by any means known in the art such as scissors, a knife, a specially designed cutter such as known for opening envelopes, etc.

FIG. 5 shows the removal of top foil 29 from the sheet pack. The operator grasps the free margin of this top foil and pulls in the direction of arrow 44. This margin, together with the corresponding margin of the underlying wrapping foil, lies almost flat on top of bar 23. We have found that withdrawal of the marginal portions of the upper foil through the gap left between the frame of the lid and the corresponding walls of the base does not raise any problem. The success of this operation depends to some extent on properties such as coefficient of friction, flexibility and toughness of the wrapping material. The wrapping material described hereinbefore is for all these aspects an excellent choice.

It is clear that during all these operations sub-lid 42 must keep a lighttight fit with frame 41. To that end, suitable latching means may be provided for locking the sub-lid to the base during the described preparation steps.

The cassette thus prepared is now ready for use and can be located inside a processor which is arranged for removing a plate from the cassette and image-wise exposing it.

FIG. 6 diagrammatically shows lifted sub-lid 42 inside a platesetter after occasional sub-lid latches have been released, and the position of stack 27 of plates in base 20 while bottom foil 30 of the wrapper is still in place. Clamps 36 and 37 keep frame 41 of the lid on its place on base 20. An advantage of lower wrapping foil 30 remaining in the cassette is that even in a dirty cassette the plates are kept under absolutely clean conditions.

FIG. 7 is a block diagram showing a platesetter with a cassette magazine at its input.

The machine comprises a cassette magazine 43, an imaging engine 45, a buffer station 46 and a processor 47 for developing, fixing and rinsing an exposed plate. Cassette magazine 43 is arranged for containing cassettes 19 for different plate sizes, four in the present example. It should be born in mind that the cassettes all are identic, only their inside adjustment being different to accomodate a corresponding plate size. A transport system 48 comprising rails, endless belts or the like is controlled by the machine to select automatically the correct cassette for a given plate size to be exposed. The cassettes 19 in magazine 43 all are lighttightly closed. A cassette is opened only when in the imaging engine, and reclosed and returned to the handler only if a next exposure should require a different plate size. Magazine 43 may be arranged in such a way that a cassette 19 can be pulled forwardly as shown in dashed lines 19' to allow the operator to load a fresh film pack in convenient circumstances.

Imaging engine 45 can be any exposure system known in the art. In the present example, it has been represented as an internal drum recorder.

Buffer station 46 receives an image-wise exposed plate from the imaging engine and buffers it until the processor is free for a next plate. Buffer station can occasionally also be arranged for notching a plate so that after wet processing it is immediately ready for mounting in a printer.

Processor 47 can be any device known in the art suitable for developing the lithographic image, and can further include cells for silver electrolysis, for ion exchange of the rinsing water, etc.

FIGS. 8 to 12 are enlarged vertical sectional views on line 8—8 of FIG. 1.

Figure 8:
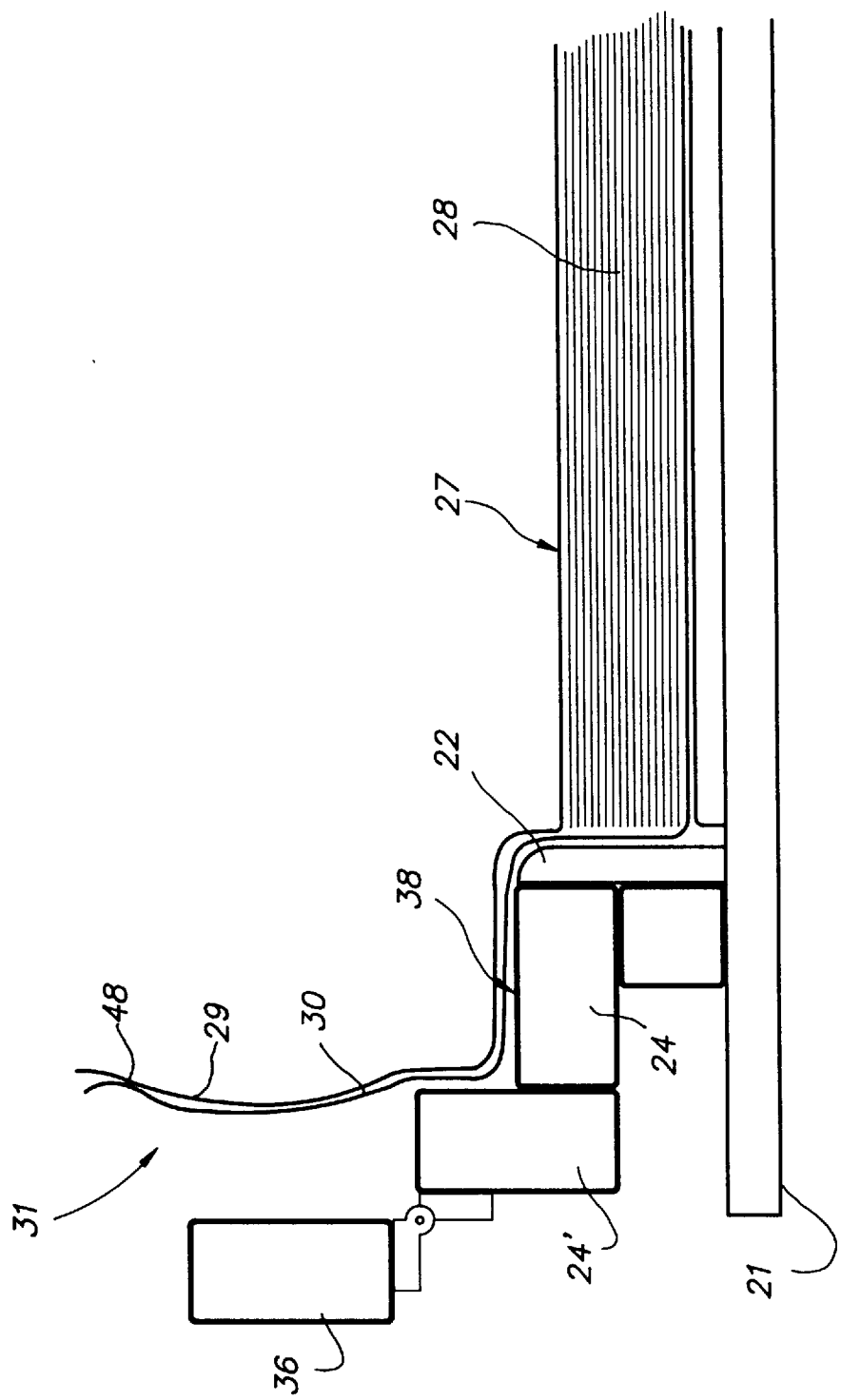
FIGS. 8 to 12 are enlarged cross-sectional views in a vertical plane comprising line 8—8 of FIG. 1.

FIG. 8 is a partial view showing wrapped sheet pack 27 located in base 20, unfolded flap 31 of the wrapper extending approximately upwardly from peripheral platform 38. Upper and lower wrapping foils 29, resp. 30, are air- and lighttightly sealed at or near their edges at position 48.

Figure 9:
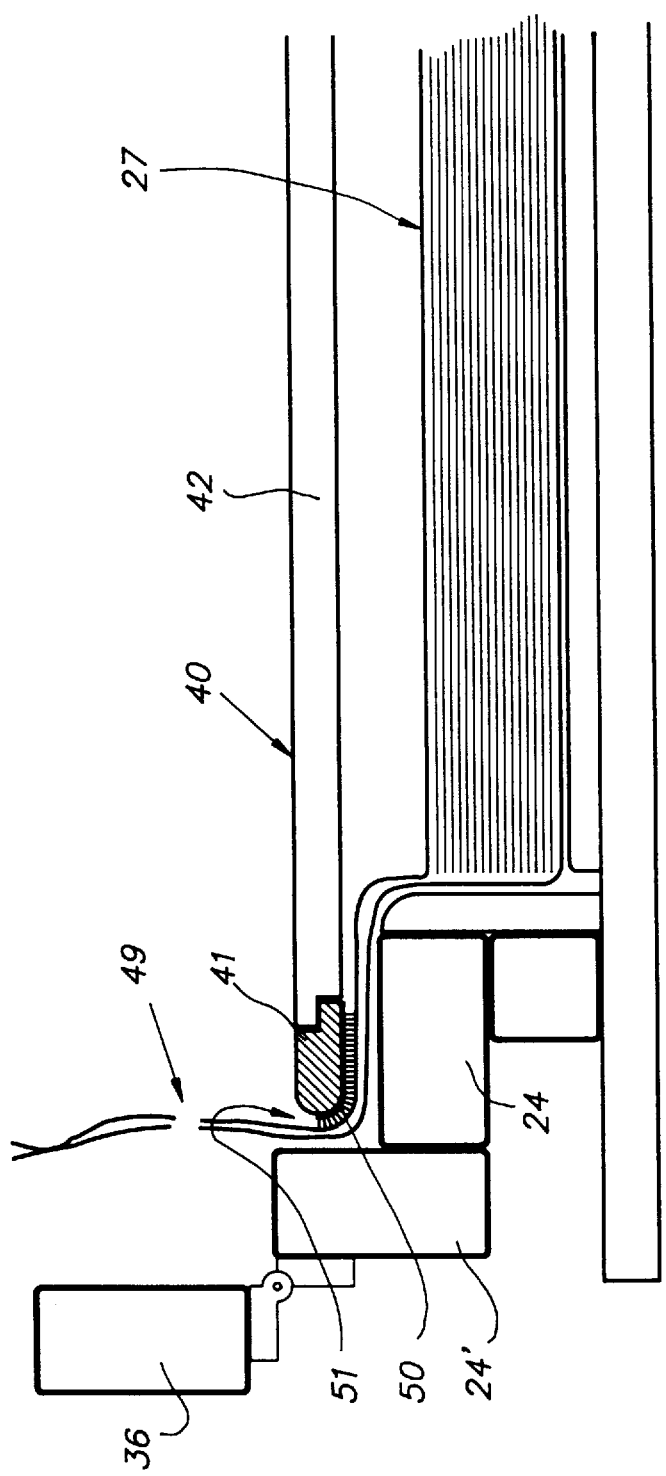

FIG. 9 shows sheet pack 27 after lid 40, consisting of frame 41 and sub-lid 42, has been placed on the base and the portion of the wrapping extending beyond the lid has been cut, see arrow 49. A peripheral gap 51 between frame 41 and bars 24', 25' and 26' allows the oversize wrapper portions to extend out of the cassette. Frame 41 is provided at its underside with a peripheral lining 50 of velvet or the like ensuring a lighttight fit between the frame and the base of the cassette, and also facilitate the sliding of the upper wrapping foil during its withdrawal.

Sub-lid 42 lighttightly fits in frame 41. This fit has been shown in the present figure as based on a labyrinth-like structure with co-operating stepped edges, but it is clear that any other fit comprising velvet, foamed rubber, magnetic strips or co-operating tongues and grooves may be used. Further, there may be provided latches for locking sub-lid 42 to frame 41 during the preparation steps as described already.

Figure 10:
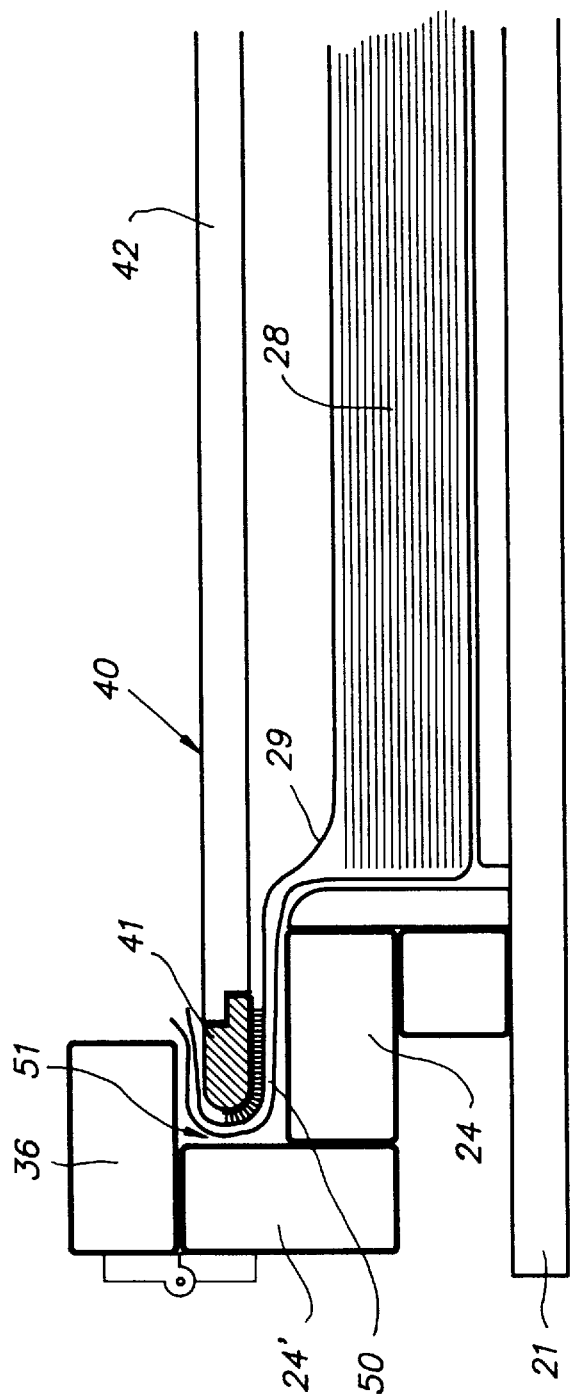

FIG. 10 shows the cassette after clamp 36 (and also clamp 37) have been swung to clamp the frame of the lid on the base.

Figure 11:
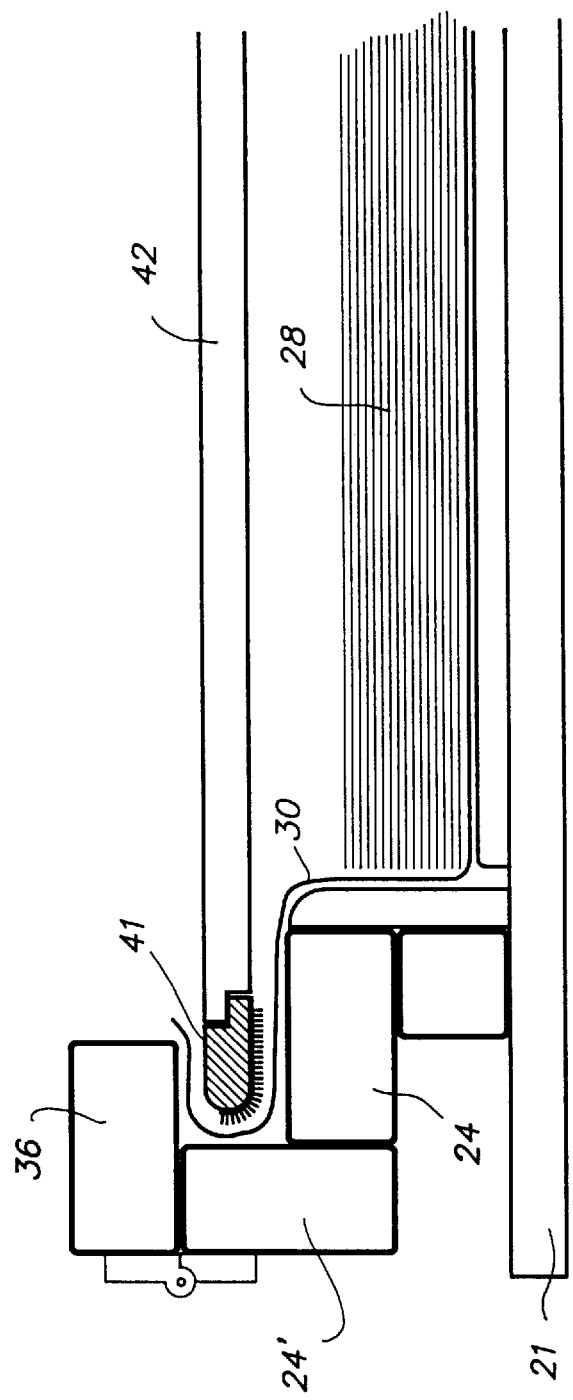

FIG. 11 shows the cassette after top foil 29 of the wrapper has been removed.

Figure 12:
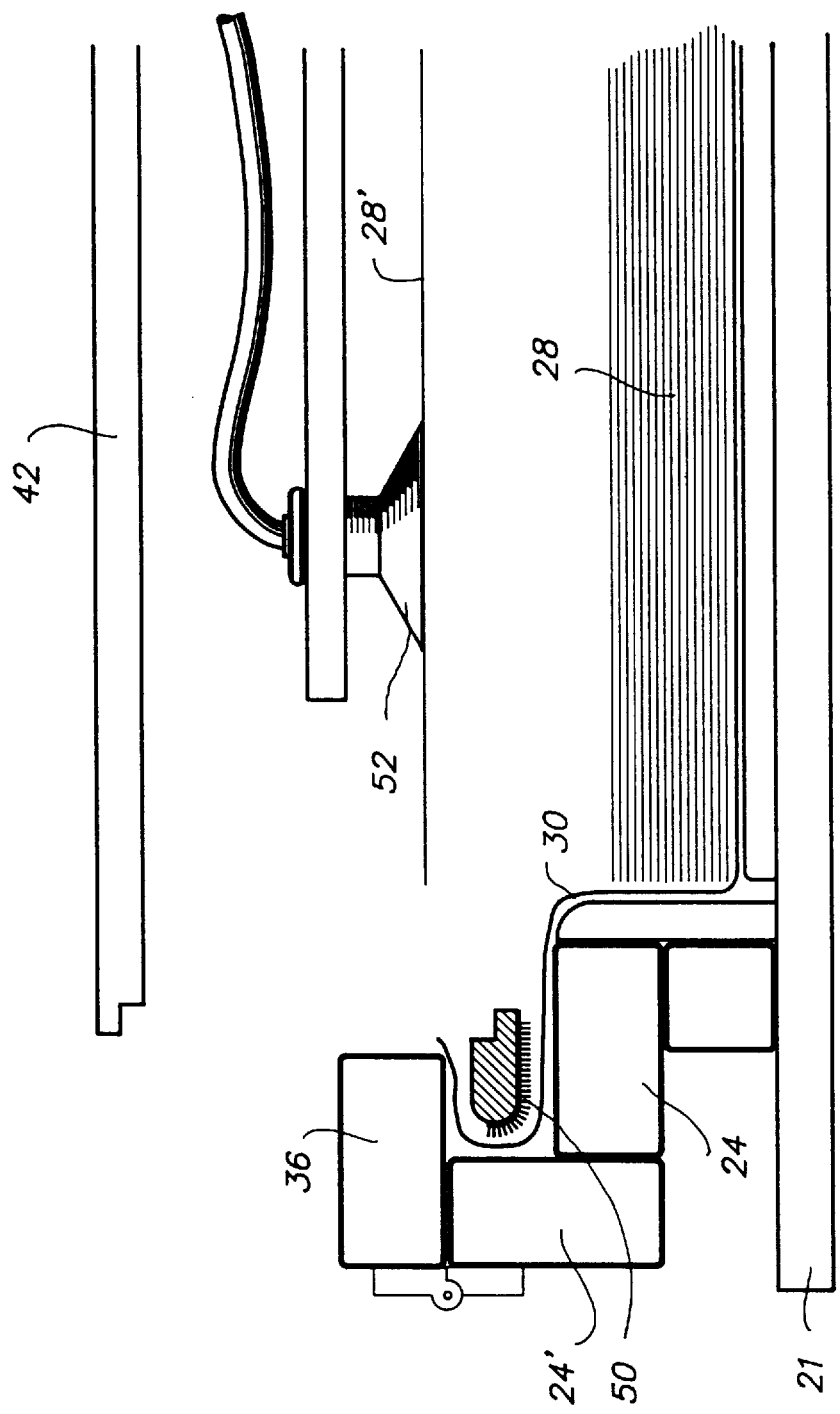

FIG. 12 shows the cassette while located inside a platesetter which has means for lifting sub-lid 42 from the base (after occasional unlocking of latches keeping the sub-lid on the frame), and also means such as suction cup 52 for removing to uppermost plate 28' from stack 28 of plates.

A cassette in accordance with the present invention is not limited to the described embodiment.

The base of the cassette must not necessarily be assembled from a base plate and a plurality of bars, but may be manufactured in one or more pieces by appropriate injection moulding techniques.

The frame of the sub-lid need not necessarily have a flat shape as shown, but may be constructed from hollow rectangular or otherwise profiled beams to obtain a rigid structure adapted for lighttight co-operation with the sub-lid.

The sub-lid can have hooks, undercuts or the like on its upper side facilitating its gripping by an opening mechanism of the platesetter.

Latches for occasionally clamping the sub-lid to the frame can be snap-in, push-release, or any other suitable latching mechanism known in the art.

There may be provided means for controlling the position of the frame of the lid in the direction of bar 23 the base. This control may be useful since it will be understood that as an operator is pulling out upper wrapping foil 29 (see FIG. 5), frame 41 tends to become displaced in that direction by friction between its underside and the foil being removed, there being no extra bar to limit displacement of the frame in that direction. Suchlike control means may comprise a lever or the like, pivoting on bar 25', and engaging with a pin a corresponding recess in sub-lid 42, as shown in dashed lines in FIG. 5 for lever 52 engaging circular recess 53. Withholding sub-lid 42 means also withholding frame 41 whereby the mentioned problem may be overcome. It is clear that many other provisions capable of limiting displacement of frame 41 in the direction of arrow 44 can be devised.

Bar 23 may be provided with an extra, raised bar such as bars 24', 25' and 26' provided for bars 24, 25 and 26. In this way the lighttightness of the cassette is further improved.

The cassette can be arranged for having sheet packs of different sizes located centrally in the cassettte, i.e. their centre coinciding with the centre of the cassette. This, however, requires more displaceable fingers for correctly positioning the sheet packs.

Finally, although in the description hereinbefore with reference to FIG. 7 it has been mentioned that the cassettes all are identic, only their inside adjustments being different, it should be understood that if a large range of different plate formats must be used, the smallest plate formats can constitute a problem since their wrappings necessarily will have large oversize flaps to still fit in the casette which on itself is large since it has to accomodate also the largest plate format. Such flaps must be folded two or more times on themselves in order to fit within the corresponding plate format. This can complicate the packaging of the plates by their manufacturer, as well as put an extra strain on the user who must carefully and completely unfold such flaps in order to ensure that their margins protrude out of the closed cassette. It is in such case better to use a small number of different cassettes, each one covering a certain number of plate formats within a limited range.

I claim:

1. A cassette for daylight-loading a photographic sheet pack in a photographic processor, said sheet pack being of a type comprising a stack of rectangular photographic light-sensitive sheets wrapped in a wrapper of a size larger than that of the sheets, said cassette comprising:

a rectangular base (20) with a bottom wall (21) and peripheral wall means (23, 24, 25, 26) providing an interior space within which the sheet pack (27) can fit, and a cassette lid (40) fitting on the base comprising rectangular frame means (41) arranged for lighttightly co-operating with said peripheral wall means, and a sub-lid (42) lighttightly fitting on said frame means.

2. A cassette according to claim 1, wherein said rectangular frame means (41) has a size generally co-extensive with said peripheral wall means.

3. A cassette according to claim 1, which comprises positioning means for controlling the lateral position of said lid on said base.

4. A cassette according to claim 3, wherein said positioning means are elongate bars (24', 25', 26') provided on at least three lateral sides of said base for encircling said frame means.

5. A cassette according to claim 4, which comprises further positioning means (52,53) for controlling the position of said frame means also in the direction of said fourth lateral side (23).

6. A cassette according to claim 1, which comprises frame-locking means for locking the frame of the lid to the base.

7. A cassette according to claim 6, wherein said locking means are clamps (36, 37) that can swing over the peripheral wall means (23,24,25,26) to co-operate with the frame means (41) of the cassette lid resting thereon.

8. A cassette according to claim 1, wherein the surface of said frame means which faces the base of the cassette is covered with a resilient light-locking material (50).

9. A cassette according to claim 8, wherein said resilient material is velvet.

10. A cassette according to claim 1, which comprises sub-lid locking means for locking said sub-lid to said frame means.

11. A cassette according to claim 1, wherein said sub-lid (42) is completely removable from said frame means (41) and has means providing a lighttight fit with said frame.

12. A cassette according to claim 1, which has adjustable means (35) for locating photographic sheet packs (27) of different sizes at the correct place in its base.

13. A method for daylight-loading a photographic sheet pack in a photographic processor, said sheet pack being of a type comprising a stack of rectangular photographic sheets wrapped in an oversized wrapper, the extending portions of the wrapper being folded back on the sheet pack, said method comprising the steps of:

the back-folded wrapper portions and putting said film pack in a cassette comprising a base and a lid lighttighly fitting thereon while yet leaving a lighttight peripheral gap through which a peripheral portion of the unfolded wrapper can protrude out of the cassette, cutting the wrapper protruding out of the cassette, and removing the outer portion, thereby leaving two separate wrapping foils inside of the cassette, pulling away the wrapping foil adjacent to the cassette lid through said peripheral gap, and introducing the cassette thus prepared in said photographic processor, lighttigthly closing the processor, and having the lid of the cassette removed by the processor to render the photographic sheets accessible for a sheet removing mechanism.

14. A method according to claim 13, which comprises daylight-loading photographic sheet packs of different sizes in a photographic processor, said different sheet packs being all wrapped in a wrapper of the same overall dimensions.

15. A method according to claim 13, wherein said photographic sheets are aluminium offset printing plates.

16. A method according to claim 13, wherein said photographic processor is a computer-to-plate imagesetter.

* * * * *

UNITED STATES PATENT AND TRADEMARK OFFICE
CERTIFICATE OF CORRECTION

PATENT NO. : 5,893,002
DATED : April 6, 1999
INVENTOR(S) : Lieven Dirx

It is certified that error appears in the above-identified patent and that said Letters Patent is hereby corrected as shown below:

Column 8, line 19, "the back-folded" should read -- unfolding the back-folded --.

Signed and Sealed this

Fifteenth Day of August, 2000

Attest:

Q. TODD DICKINSON

Attesting Officer

Director of Patents and Trademarks